United States Patent [19]

Barbieri

[11] 4,165,175

[45] Aug. 21, 1979

[54] APPARATUS FOR SAMPLING PRINTING LIGHT IN A PHOTOGRAPHIC ENLARGER FOR DETERMINING ITS COLOR COMPOSITION

[75] Inventor: Siegfried Barbieri, Brixen, Italy

[73] Assignee: Durst AG. Fabrik Fototechnischer Apparate, Bozen, Italy

[21] Appl. No.: 806,625

[22] Filed: Jun. 15, 1977

[30] Foreign Application Priority Data

Jun. 25, 1976 [IT] Italy .................................. 4836 A/76

[51] Int. Cl.² .............................................. G03B 27/78
[52] U.S. Cl. ......................................... 355/38; 356/404
[58] Field of Search ..................................... 355/35–38, 355/68; 356/175, 178, 195, 202, 203; 354/56, 59, 23 R; 350/96 R, 96 LT

[56] References Cited

U.S. PATENT DOCUMENTS

| | | | |
|---|---|---|---|
| 2,480,425 | 8/1949 | Simmon | 355/68 |
| 3,184,307 | 5/1965 | Letzer | 355/38 |
| 3,359,424 | 12/1967 | Dreyfoos | 355/38 |
| 3,779,146 | 12/1973 | Trankner | 355/68 X |
| 3,985,450 | 10/1976 | Barbieri et al. | 355/38 X |
| 4,030,833 | 6/1977 | Barbieri | 355/38 X |

*Primary Examiner*—L. T. Hix
*Assistant Examiner*—W. J. Brady
*Attorney, Agent, or Firm*—Connolly and Hutz

[57] ABSTRACT

The color composition of printing light in a photographic enlarger is sampled by rotating a sampling duct between the original image holder and the objective lens. The duct has a thin elongated rectangular shape with a light diffusing aperture disposable in the printing light and with mirrored inside walls, which transmit a representative sample of the printing light to the outlet aperture, which is disposed in front of light measuring receivers. The receivers generate a signal which is processed to govern the insertion of filters in the light-mixing head of the enlarger to provide the desired color composition in the printing light. A convenient push control and actuating switch arrangement is provided to simplify insertion of the duct in the printing light before and its removal during the printing exposure.

24 Claims, 4 Drawing Figures

APPARATUS FOR SAMPLING PRINTING LIGHT IN A PHOTOGRAPHIC ENLARGER FOR DETERMINING ITS COLOR COMPOSITION

BACKGROUND OF THE INVENTION

The invention relates to apparatus for determining the color composition of printing light in photographic enlarging apparatus.

Prior forms of such measuring apparatus have a measuring probe which contains at least one photo-electric transducer, and which is introduced into the printing light ray path immediately below the objective of the enlarging apparatus during the measuring operation. The measuring probe is connected by way of an electrical lead to an evaluating apparatus containing a measuring circuit and an indicator unit. One form of measuring apparatus is miniaturised to such an extent that the measuring probe and evaluating apparatus form one unit which can be pivoted into the path of rays immediately below the objective of the enlarging apparatus for the measuring operation.

The introduction of a measuring probe or a measuring apparatus into the path of rays leads to rather complicated manipulation, since the objective which is covered over by the measuring probe during measuring must be free during the printing operation in order that the printing light can reach the projection surface. This disadvantage is particularly noticeable when the filter determination for which the measuring apparatus is used takes place before the printing operation for each individual original, since frequent introduction and removal of the measuring probe is then necessary.

The light which passes through the objective is influenced not only by the original which is situated in the enlarging apparatus during the measuring operation, but generally also by a variable aperture diaphragm. If each color component of the printing light is measured on its own rather than being compared to another color component, care must be taken to insure that the same diaphragm value is set during each measurement. Measurements are normally carried out with the diaphragm fully open, since the maximum measuring light is then available. Measurements are normally also carried out with a fully open diaphragm in the case of measuring apparatuses with which the relationship between individual color components is measured, since it may be that only in this state is there sufficient light available for the photo-electric transducer arranged in the measuring probe. It therefore becomes necessary for the operator of the enlarging apparatus to adjust the objective diaphragm before and after the measuring operation, since printing is not carried out with a fully open diaphragm in most cases.

Enlarging apparatuses are known which allow prints to be made in daylight or with lighting similar to daylight, being provided for this purpose with a lightproof closed screening arrangement between the objective and the projection surface. Apparatuses of this type suffer from the disadvantage that the introduction of a measuring probe below the objective is very complicated, since the screening arrangement must be removed for this purpose and fitted again for the printing operation.

SUMMARY

The invention provides apparatus for determining the color composition of the printing beam in photographic enlarging apparatus, which comprises one or more light-sensitive receivers, and means for mixing light from the printing beam and for transmitting it to the light-sensitive receivers, the transmitting and mixing means being capable of being introduced in use into the path of the printing beam between the original and the objective.

With such measuring apparatus, the measurements are independent of the diaphragm set on the objective, and the other disadvantages referred to can be reduced or avoided. Compared with previously known apparatuses, the measuring apparatus according to the invention offers the advantage of increased convenience of operation without necessitating higher costs, since sufficient light falls onto the measuring receivers either for the same relatively insensitive measuring receivers as in previously known apparatuses to be used, or for, when using more sensitive measuring receivers, there to be no need for large expenditure on the measuring circuit; due to the high level of measurement signals available, the circuitry can be such that any errors which do arise in the circuitry will affect the measurements only to a negligible extent.

The measuring apparatus also has the advantage that it can be used in daylight enlarging apparatus: all the operating members can be arranged outside the light-screening arrangement. Advantageously, the light-transmitting and mixing means includes a light-transmitting duct extending substantially parallel to the plane of the original, and having reflecting internal surfaces. Preferably, the light-transmitting shaft is of rectangular section, one side of the rectangle being small in length compared to the other, and the duct being capable of insertion with the longer side parallel to the plane of the original. This enables the apparatus to be used even with objectives of very short focal length when the space available between original and objective is restricted. Light diffusing means, for example, a plate, may be provided in the shaft in the path of the printing beam in its operative position.

The light-transmitting duct may be pivotally mounted such that it can be pivoted in beneath the original. The pivoting may be in response to actuation of a push control on the front of the apparatus. A separate push control may be provided for each filter measurement to be carried out, such that depression of the respective push control automatically insures that the respective filter measurement will take place. The push controls may be spring-biased into the inoperative position.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 2 is a cross-sectional view taken through FIG. 1 along the line 2—2;

FIG. 4 is a schematic electrical diagram for the embodiment of this invention shown in FIGS. 1-3.

DESCRIPTION OF THE PREFERRED EMBODIMENT

Figure 1:
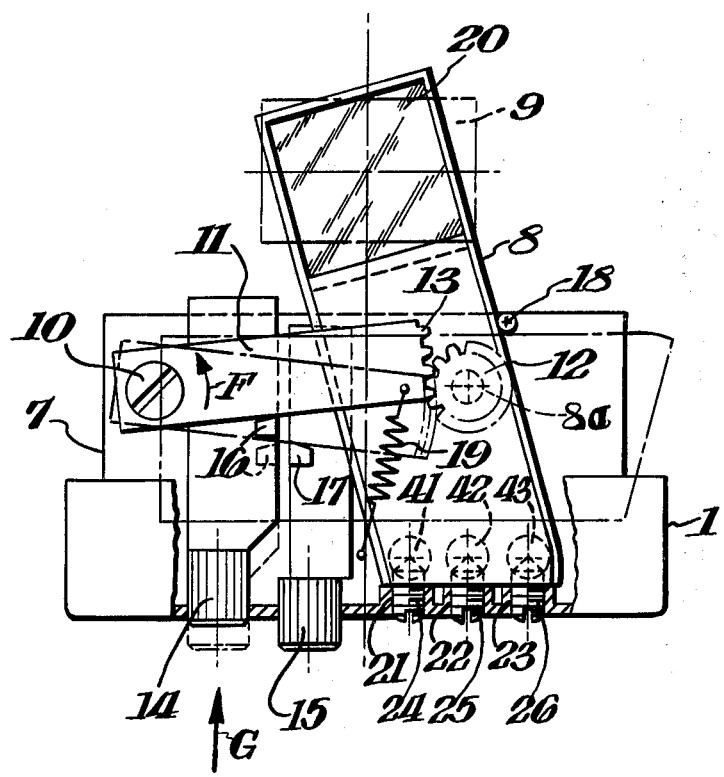
FIG. 1 is a schematic plan view of one embodiment of this invention.

The housing 1 of the sampling apparatus is attached by means of two screws 2 and 3, for example, to an opening on the front of the head 4 of a photographic enlarging apparatus in the space between a support or holder 5 for the original image (for example, a negative) being printed, and the objective 6 of the enlarging apparatus. The housing 1 contains a plate 7 on which a light-transmitting and mixing means, for example, a light-transmitting duct 8 (to be described hereinafter), is pivotally arranged.

In order to measure the color composition of the printing beam the duct 8 is pivoted into the path of rays of the printing beam (which issue from a light source arranged in the head 4), that is, into the position indicated by solid lines (FIG. 1), below the original 9 in the original support 5. In this position the light-transmitting duct 8 receives the light transmitted through the original 9, and the light is mixed inside the duct and led to three measuring receivers 41, 42, 43, for example, which are situated in the housing and each of which is made sensitive to one of the three primary colors red, green or blue by means of a corresponding color filter. In the rest position, that is, when not in use, the light-transmitting duct 8 is pivoted out of the path of rays and can for example be situated in the position indicated in the drawing by broken lines.

Figure 3:
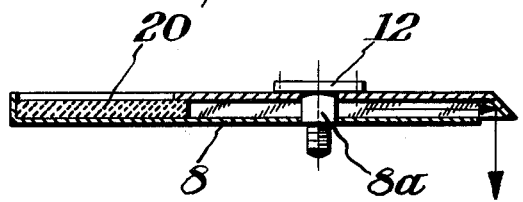
FIG. 3 is a view in elevation of a portion of a photographic enlarger incorporating one embodiment of this invention.

The pivoting movement of the light-conducting duct 8 is controlled by drive means which are operated from the front of the enlarging apparatus, although the drive means can be operable from elsewhere if desired. The drive means consists of a lever 11 which is pivotable about an axis of rotation 10 and is provided with a toothed wheel rim 13 engaging in a gearwheel 12 rigidly connected to the light-transmitting shaft 8; the lever 11 is actuated by means of two push controls 14, 15 which are mounted on the front of the housing 1. Two push controls are provided since (as will be explained hereinafter) two measurements are made to determine the color composition of the light. The push controls slide in corresponding guides (not shown), and each has a projection 16 or 17. The projections 16, 17 are so arranged that they both engage with the lever 11 at approximately the same position along its length. When one of the push controls 14 or 15 is moved by the operator in the direction of the arrow G, the lever 11 rotates about its axis of rotation 10 in the direction of the arrow F and, by means of the gearwheel connection described, causes the light-transmitting duct 8 to rotate in a clockwise direction about its axis of rotation 8a (FIGS. 1 and 3).

The light-transmitting duct 8 can thus be pivoted into the path of the printing rays, where its end position is determined by means of a stop 18. The return of the light-transmitting duct 8 to its rest position is brought about by means of a spring 19 (for example) which engages with the lever 11 and is tensioned during the pivoting movement. Thus, the light-transmitting shaft 8 is only pivoted into the path of rays when the operator applies pressure to one of the push controls 14, 15. When the controls are released, the light-transmitting shaft returns automatically to the rest position and thus moves out of the printing beam. Due to the positioning of the projection 16,17 close to each other, the force that has to be exerted on the two push controls 14, 15 is approximately the same.

The light-transmitting duct 8 is preferably rectangular in cross-section, and its height is small in relation to the length of the side running parallel to the plane of the original. Due to this flat shape, the light-transmitting shaft 8 can be used in enlarging apparatus fitted with a short focal length objective (when the space between the original 9 and the objective 6 will be restricted).

The light-transmitting duct 8 can be produced from sheet-metal having a mirror surface on the inside (for example), and having, on the side facing the original, a light-collecting aperture containing diffusing means, for example a diffusing plate 20, made for example of ground glass or any other suitable light diffusing material. The aperture preferably corresponds in area to that of the original 9 (defined by the dash/dotted lines), so that practically all the light passing through the original can enter the light-transmitting duct 8 when the latter is in its pivoted-in end position. In order to increase the light absorption through the diffusing plate 20 and/or to reduce reflection, the surface of the plate that faces the original is preferably roughened or constructed in a saw-tooth shape. At the end which is situated over the measuring receivers in the pivoted-in position (FIGS. 1 and 3), the light-transmitting duct 8 has a light outlet aperture which is so shaped that the transmitted light is guided onto the measuring receivers.

Due to the fact that the light is diffused by means of the diffusing plate 20 at the entry of the light-transmitting duct 8 and is also intensively mixed in the latter by multiple reflection, measuring light of the same color composition reaches each filter in front of the individual measuring receivers so that measuring errors due to uneven color distribution in the original do not occur. The amount of measuring light fed to each measuring receiver can be controlled by means of suitable diaphragms, such as screws 24, 25, 26 received in corresponding threaded holes 21, 22, 23, as shown in U.S. Pat. No. 4,030,833, issued on May 21, 1977 by the same inventor. This makes it possible to calibrate the measuring apparatus in a manner which will be briefly summarized hereinafter.

Figures 2, 4:
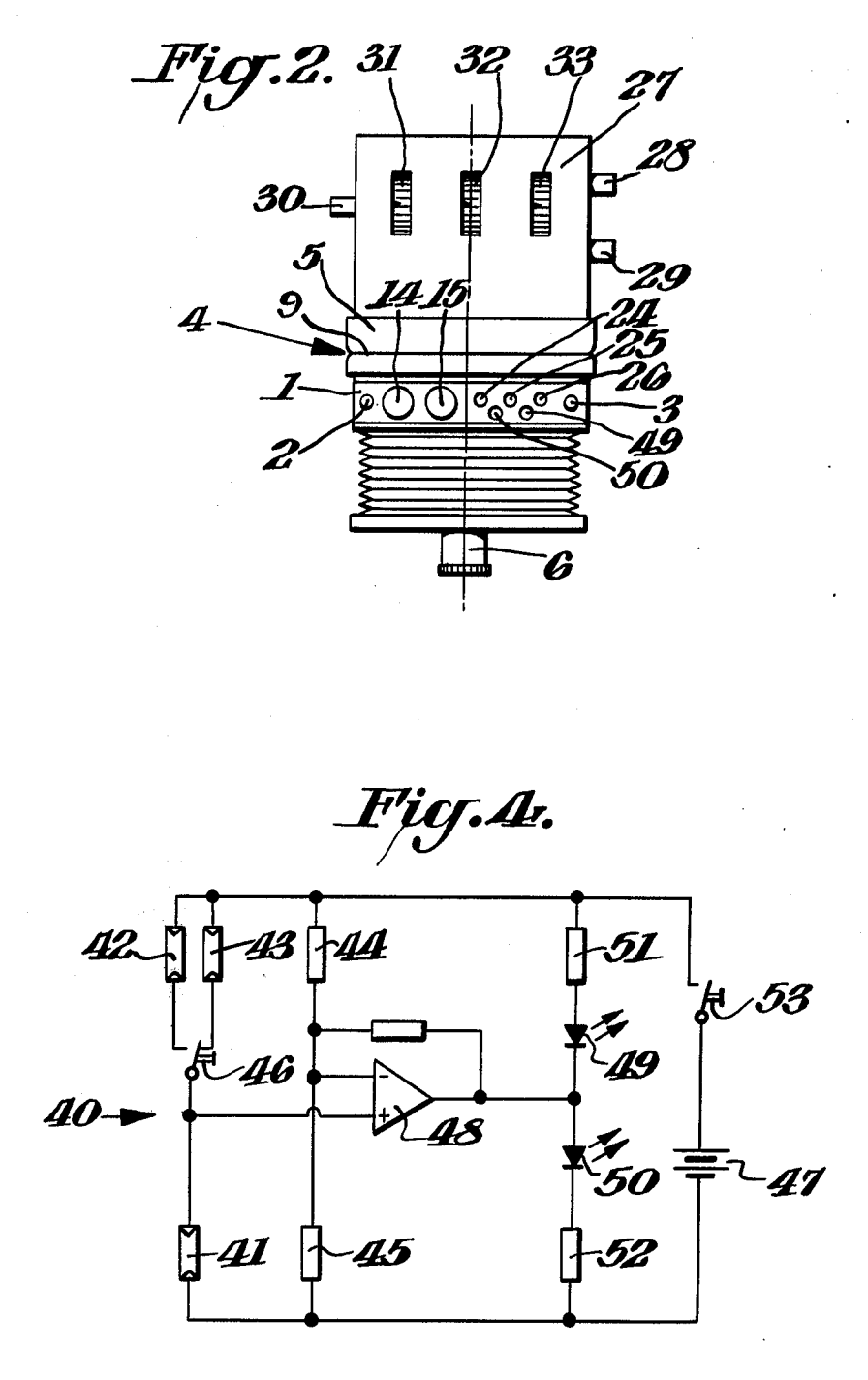

FIG. 4 shows a possible circuitry arrangement 40 for the evaluation of the measurement signals. The measuring receivers are in the form of three photo-resistors 41, 42, 43. The photo-resistor 41 is sensitive to red, for example, the photo-resistor 42 to green, and the photo-resistor 43 to blue (primary colors), and the sensitisation for each of these primary colors is achieved by means of color filters as already mentioned which are arranged in front of the photo-resistors. The circuit operates by comparing the ratios of the intensities of the green component and the red component, and of the blue component and the red component. Two measurements are thus made, and a changeover switch 46 is provided to enable each to be made. The use of circuitry for comparing color components is described and claimed in U.S. Pat. No. 3,985,450.

The changeover switch 46 is coupled to the means for pivoting the light-transmitting duct 8 into its operative position. As will be explained hereinafter, the changeover switch 46 is switched by the push controls 14 and 15.

The photo-resistor 41 and either one of the photo-resistors 42 or 43 are arranged in two adjacent branches of a resistance measuring bridge, which is completed by fixed resistors 44 and 45 in the other two branches. By means of the changeover switch 46, either the photo-resistor 42 or the photo-resistor 43 can be switched into the measuring circuit. The measuring bridge is supplied across one diagonal by a voltage source 47. The measurement signal is picked off across the second diagonal and fed to a differential amplifier 48 which has its output connected in a known manner to two lamps, for example, two light-emitting diodes 49, 50, connected in parallel with the voltage source. Resistors 51 and 52 serve to limit the current in the current circuit of each of these light-emitting diodes. When the measuring bridge is untuned, only one of the two light-emitting diodes 49 or 50 lights up, depending on the direction of untuning, while both light-emitting diodes light up with equal intensity when the bridge is balanced. When the photo-resistor 42 is connected to the measuring bridge by means of the changeover switch 46, the ratio of the primary colors red and green in the printing beam is measured, whereas in the second position of the changeover switch, in which the photo-resistor 43 is connected, the ratio of the primary colors red and blue is measured.

The measuring bridge is tuned, that is, balanced, first during the calibration of the measuring apparatus. This is done by adjusting the quantity of light which meets the photo-resistors, that is, by adjusting the screws 24, 25, 26. The bridge is also balanced during the actual measurements for determining the color composition, by suitably altering the color composition of the printing light by means of color filters; this is preferably achieved by using as the printing light source a so-called color mixing head 27 in which the primary color proportions of the printing light emitted can be continuously varied. The variation is produced by introducing filters in the subtractive colors yellow, blue/green (cyan) and purple (magenta) by varying amounts into a beam of white light emitted by a light source. The depth of introduction of the individual filters determines the color density of the printing light in the color in question. The individual color filters are moved by means of setting members 28, 29, 30 respectively; the corresponding filter position is indicated on corresponding scales 31, 32, 33.

It is not necessary in most cases for the blue/green or cyan filter to be introduced into the path of rays, or for its position to be altered with respect to a previous printing situation, and so the balancing operation is generally confined to altering the depth of introduction of the yellow and purple (magenta) filters. For this reason, separate actuating controls, that is, the push controls 14 and 15, are associated with each of these filter colors.

For example, the push control 14 might be associated with the filter color yellow and the push control 15 with the filter color purple (magenta). One of the two push controls, for example, the push control 14, has the changeover switch 46 associated with it in such a manner that the contact position of the switch depends on the position of the push control. Thus, either the photo-resistor 42 or the photo-resistor 43 is switched into the measuring circuit, depending on which push control is actuated. For example, the switching contact of the changeover switch 46 could be in the position shown in the drawing, in the rest position of the push control 14. In this position, the blue-sensitive photo-resistor 43 is connected, but on actuation of the push control 14 in the direction of the arrow G, the switching contact of the changeover switch 46 switches into its second position and connects the green-sensitive photo-resistor 42.

As a result of this arrangement, when the push control 14 is actuated the ratio of the primary color components red and green is measured, which ratio can be influenced by means of the purple (magenta) filter in the color mixing head 27, and when the push control 15 is actuated, the push control 14 then being in the rest position, the ratio of the primary color components red and blue is measured, which ratio can be influenced by means of the yellow filter in the color mixing head 27.

In order to insure that measurement cannot take place until the light-transmitting shaft 8 is fully pivoted into its end position beneath the original, it is of advantage to provide an end switch actuated by the light-transmitting duct 8 when it reaches its end position. An end switch of this type is shown in FIG. 4 by the reference number 53. In its normal position the switch 53 interrupts the current supply to the measuring bridge and is closed when the pivoted-in end position of the light-transmitting duct 8 is reached, but opens again automatically when the light-transmitting duct leaves its end position again. The changeover switch 46 and the end switch 53 are shown only in FIG. 4 and not in the other figures, but the association of the switches with the corresponding mechanical parts presents no problems.

The two light-emitting diodes 49, 50 are mounted visibly on the front of the housing 1. All components relating to the measuring circuit are arranged inside the housing 1.

The color filtering of the printing light needed for the printing operation is determined in the following manner.

First the push control 14 is actuated, whereupon the changeover switch 46 is switched over and the photo-resistor 42 is connected in the measuring circuit. As described above, the light-transmitting duct 8 is simultaneously pivoted into the printing beam beneath the original 9. When the end position is reached, the end switch 53 is switched over by means of the light-transmitting duct 8 and the current circuit is closed, whereupon the measuring circuit is switched on. Generally only one light-emitting diode lights up, indicating that the measuring bridge is out of balance and a filter value other than the one just set is necessary for a correct print. The position of the purple (magenta) filter in the color mixing head 27 is then altered by actuation of the appropriate setting member until both luminous diodes are of equal brightness.

After balancing, the push control 14 is released. Thereupon the light-transmitting duct 8 returns to its rest position, the end switch 53 opens interrupts the current circuit, and the contact of the changeover switch 46 returns to its initial position, disconnecting the photo-resistor 42 from the measuring circuit and connecting the photo-resistor 43. The second push control 15 is then actuated. Since the latter has no effective connection with the changeover switch 46, the photo-resistor 43 remains connected to the measuring circuit and the rest of the operation takes place in the manner just described. In this case the ratio of the primary colors red and blue is measured, with the measuring bridge being tuned by suitable adjustment of the yellow filter by means of the corresponding setting member. After these two tuning operations, a color filtering of the printing light corresponding to correct color balance for the subsequent printing is obtained. It is necessary also to alter the position of the blue/green (cyan) filter in the color mixing head 27 only when the measuring bridge cannot be balanced by means of the two tuning operations described above.

As stated above, the measuring operation is preceded by a calibration operation during which a print with satisfactory color balance is produced in a known manner from an original with an even color distribution by means of test exposures. When these filter values for a satisfactory print have been experimentally determined, the original used for the test print is introduced into the original support 5. Then the two push controls 14 and 15 are actuated in the manner already described, and the measuring bridge is balanced in each case, but as compared with the procedure described previously, the bridge is balanced not by further adjustment of the color filters but by adjustment of the screws 24, 25, 26. The latter are moved in front of the individual photoresistors 41, 42, 43 to control the light incident thereon, to such an extent that the measuring bridge is balanced for both of the positions of the contact of the changeover switch 46. The position of the screws 24, 25, 26 determined during calibration need then only be altered if originals with different characteristic color distributions are being printed, or if printing paper is used which has different characteristics from those of the paper used during calibration.

The balancing of the measuring bridge can be achieved not only by way of a color mixing head but also with any means with which the color composition of the printing light can be altered. Thus, measurement of the necessary color composition can be carried out with the printing light unaltered during the measuring operation, if corresponding adjustable resistors, for example, potentiometers, are arranged in those bridge branches where fixed resistors 44 and 45 are used in the arrangement described. In this case, the actual potentiometer position at which the bridge equilibrium is reached provides a measurement for the filter values required. The calibration values may be stored by means of corresponding potentiometers in the measuring bridge.

It is not necessary for the light-transmitting and mixing means, like the light-transmitting shaft 8 shown in the drawing, to receive light from almost the whole of the original. To obtain usable results it is sufficient to measure an important section of the image, which generally lies in the center of an original. As a result, the measuring apparatus described may also be used for originals of different formats. The projection of the light collecting aperture of the light-transmitting and mixing means in the plane of the original preferably corresponds to a smaller format than the maximum that can be printed with the enlarging apparatus.

If desired, the two push controls 14 and 15 may be replaced by a single push control. In this case, the changeover switch may be operated separately. Alternatively, if a different measuring circuit is provided in which separate measurements are made on all three components, it may be desirable to provide three push controls.

I claim:

1. An apparatus for taking samples of the light projected in a photographic enlarger, having an image holder, an objective lens, a substantially planar space disposed therebetween and a color-determining device, and transmitting the samples to the color-determining device comprising an elongated sampling duct, movable support means mounting the sampling duct in the substantially planar space between the image holder and the objective lens, drive means for interposing the sampling duct in a position between the path of the printing light and the color-determining device for determining the color composition of the printing light and removing the sampling duct from the path of the printing light to obtain an exposure of the image in the photographic enlarger, and the sampling duct having a light entrance aperture disposed substantially parallel to the image holder when it is interposed between the path of the printing light and the color-determining device whereby the color content of the printing light is determined.

2. An apparatus as set forth in claim 1 wherein the elongated sampling duct includes light-transmitting and mixing means.

3. An apparatus as set forth in claim 2 wherein light-diffusing means is disposed in the entrance of the sampling duct.

4. An apparatus as set forth in claim 3 wherein the light-diffusing means comprises a light-diffusing plate disposed in the light entrance aperture of the sampling duct.

5. An apparatus as set forth in claim 4 wherein the light-diffusing plate has an irregular surface disposed toward the light transmitted through the image holder.

6. An apparatus as set forth in claim 5 wherein the irregular surface comprises a saw-toothed surface.

7. An apparatus as set forth in claim 1 wherein the movable support means comprises rotatable means wherein the light transmitting duct can be pivoted into and out of the path of light transmitted from the image holder to the objective lens and into and out of communication with the color-determining device.

8. An apparatus as set forth in claim 7 wherein the drive means includes a push control which can be actuated from the front of the photographic enlarger.

9. An apparatus as set forth in claim 1 wherein the color-determining device includes light sensitive receivers, the sampling duct having a light exit region, and the light sensitive receivers being disposed in the path of light coming from the exit region of the light sampling duct when it is disposed in the path of the printing light.

10. An apparatus as set forth in claim 1 wherein drive means comprise manually operable drive control means, and the manually operable drive control means being disposed on and operable from the front of the photographic enlarger.

11. An apparatus for taking samples of the light projected in a photographic enlarger, having an image holder, an objective lens and a color-determining device, and transmitting the samples to the color-determining device comprising an elongated sampling duct, movable support means mounting the sampling duct between the image holder and the objective lens, drive means for interposing the sampling duct between the path of the printing light and the color-determining device for determining the color composition of the printing light and removing the sampling duct from the path of the printing light to obtain an exposure of the image in the photographic enlarger, the sampling duct has an entrance disposable in the path of light transmitted through the image holder, light-diffusing means is disposed in the entrance of the sampling duct, the sampling duct has internal light-transmitting surfaces disposed substantially parallel to the image holder, and the light-transmitting surfaces comprise light reflecting internal surfaces.

12. An apparatus as set forth in claim 11 wherein the sampling duct has a substantially rectangular shape with a relatively longer length, a shorter width and a much smaller thickness, and the length and width defining planes which are disposed parallel to the image holder.

13. An apparatus for taking samples of the light projected in a photographic enlarger, having an image holder, an objective lens and a color-determining device, and transmitting the samples to the color-determining device comprising an elongated sampling duct, movable support means mounting the sampling duct between the image holder and the objective lens, drive means for interposing the sampling duct between the path of the printing light and the color-determining device for determining the color composition of the printing light and removing the sampling duct from the path of the printing light to obtain an exposure of the image in the photographic enlarger, the movable support means comprises rotatable means wherein the light transmitting duct can be pivoted into and out of the path of light transmitted from the image holder to the objective lens and into and out of communication with the color-determining device, the sampling duct, movable support and drive means are mounted in a housing, and an opening is provided in the enlarging apparatus between the image holder and the objective lens in which the housing is inserted.

14. An apparatus for taking samples of the light projected in a photographic enlarger, having an image holder, an objective lens and a color-determining device, and transmitting the samples to the color-determining device comprising an elongated sampling duct, movable support means mounting the sampling duct between the image holder and the objective lens, drive means for interposing the sampling duct between the path of the printing light and the color-determining device for determining the color composition of the printing light and removing the sampling duct from the path of the printing light to obtain an exposure of the image in the photographic enlarger, the movable support means comprises rotatable means whereby the light transmitting duct can be pivoted into and out of the path of light transmitted from the image holder to the objective lens and into and out of communication with the color-determining device, the drive means includes a push control which can be actuated from the front of the photographic enlarger, the push control includes a lever, a gear wheel being rigidly connected to the sampling duct, and a gear toothed section on the end of the lever is operatively engaged with the gear wheel for rotating the gear wheel in response to movement of the lever.

15. An apparatus as set forth in claim 14 wherein spring means reacts between the enlarger and the sampling duct biasing it into a position disposed outside of the path of the printing light.

16. An apparatus as set forth in claim 15 wherein the push control includes a pair of push buttons which react against the lever.

17. An apparatus for taking samples of the light projected in a photographic enlarger, having an image holder, an objective lens and a color-determining device, and transmitting the samples to the color-determining device comprising an elongated sampling duct, movable support means mounting the sampling duct between the image holder and the objective lens, drive means for interposing the sampling duct between the path of the printing light and the color-determining device for determining the color composition of the printing light and removing the sampling duct from the path of the printing light to obtain an exposure of the image in the photographic enlarger, the drive means comprises at least two drive actuating controls, the color-determining means including at least two different stages and each of the drive actuating controls being associated with a different color-determining stage.

18. An apparatus as set forth in claim 17 wherein each color-determining stage includes means for individually comparing one primary color component with another primary color component, and each of the drive actuating controls being associated with means for making a different comparison.

19. An apparatus as set forth in claim 18 wherein each of the color component comparing stages includes electrical circuitry, a change-over switch being connected to the circuitry for switching from one to the other of the color component comparing stages and at least one of the drive actuating controls being connected to the change-over switch.

20. An apparatus as set forth in claim 19 wherein the color component comparing stages each include light sensitive receivers, each of which is sensitized to a different one of the three primary colors.

21. An apparatus as set forth in claim 20 wherein the light sensitive receivers are photo-resistors.

22. An apparatus as set forth in claim 21 wherein the color-determining means includes a resistance measuring bridge having several branches, a photo-resistor being connected in two of the branches and fixed and/or variable resistors being associated with other branches of the bridge.

23. An apparatus as set forth in claim 22 wherein a source of voltage is provided, an actuating switch and circuit means connect the source of voltage to each of the light-comparing stages, and the actuating switch being disposed in the path of movement of the sampling duct for causing the actuating switch to be operated only when the sampling duct is disposed in a position in which it is fully inserted in the path of printing light for taking a sample thereof.

24. An apparatus for taking samples of the light projected in a photographic enlarger, having an image holder, an objective lens and a color-determining device, and transmitting the samples to the color determining device comprising an elongated sampling duct, movable support means mounting the sampling duct between the image holder and the objective lens, drive means for interposing the sampling duct between the path of the printing light and the color-determining device for determining the color composition of the printing light and removing the sampling duct from the path of the printing light to obtain an exposure of the image in the photographic enlarger, the color-determining device has associated circuitry, the color-determining device and associated circuitry are contained in a housing, the housing also containing the sampling duct, the movable support means and the drive means, and the enlarger having slot means for disposing the housing between the image holder and the objective lens.

* * * * *